(12) United States Patent
McCaleb et al.

(10) Patent No.: US 7,853,943 B2
(45) Date of Patent: **\*Dec. 14, 2010**

(54) INTELLIGENT PATCH CHECKER

(75) Inventors: Jed McCaleb, San Francisco, CA (US); Russel Rive, Palo Alto, CA (US)

(73) Assignee: Dell Marketing USA, L.P., Round Rock, TX (US)

( * ) Notice: Subject to any disclaimer, the term of this patent is extended or adjusted under 35 U.S.C. 154(b) by 1045 days.

This patent is subject to a terminal disclaimer.

(21) Appl. No.: 11/111,292

(22) Filed: Apr. 20, 2005

(65) Prior Publication Data

US 2005/0193386 A1    Sep. 1, 2005

Related U.S. Application Data

(63) Continuation of application No. 10/869,591, filed on Jun. 15, 2004, now Pat. No. 7,171,660, which is a continuation of application No. 09/580,931, filed on May 25, 2000, now Pat. No. 6,751,794.

(51) Int. Cl.
*G06F 9/44* (2006.01)
*G06F 9/445* (2006.01)
*G06F 15/177* (2006.01)

(52) U.S. Cl. ............... 717/173; 717/168; 717/170; 717/172; 717/177; 717/178; 709/220; 709/221

(58) Field of Classification Search ............ None
See application file for complete search history.

(56) References Cited

U.S. PATENT DOCUMENTS

| | | | |
|---|---|---|---|
| 4,356,545 A | 10/1982 | West | |
| 4,425,625 A | 1/1984 | Seligman et al. | |
| 4,558,413 A | 12/1985 | Schmidt et al. | |
| 4,678,002 A | 7/1987 | Valley | |

(Continued)

FOREIGN PATENT DOCUMENTS

EP    0809182 A1    11/1997

OTHER PUBLICATIONS

Novoa, Maria R., "PCT Search Report", 4 pages.

*Primary Examiner*—Tuan Q Dam
*Assistant Examiner*—Hanh T Bui
(74) *Attorney, Agent, or Firm*—Schwegman, Lundberg & Woessner, P.A.

(57) ABSTRACT

A method for remotely updating software in a plurality of computer systems is disclosed. In one embodiment, a client computer sends application information about a software application to a server system. The server system performs a comparison between the application information about the software application and the most-updated upgrade package for the software application. The most-updated upgrade package for the software application is stored in a part database. The most-updated upgrade package for the software application is received by the client system automatically when the comparison indicates that the most-updated upgrade package has not been installed on the client system. A client database stores a plurality of configuration files for a plurality of client systems. A first configuration file provides the sever system with the knowledge of the software applications installed on the client system. The application information about the software application comprises version information of the software applications and is stored in a database in the client system.

18 Claims, 7 Drawing Sheets

U.S. PATENT DOCUMENTS

| | | | |
|---|---|---|---|
| 4,695,946 A | 9/1987 | Andreasen et al. | |
| 4,823,343 A | 4/1989 | Takahashi | |
| 5,084,875 A | 1/1992 | Weinberger et al. | |
| 5,124,622 A | 6/1992 | Kawamura et al. | |
| 5,144,659 A | 9/1992 | Jones | |
| 5,179,695 A | 1/1993 | Derr et al. | |
| 5,274,546 A | 12/1993 | Kinoshita | |
| 5,287,505 A | 2/1994 | Calvert et al. | |
| 5,357,519 A | 10/1994 | Martin et al. | |
| 5,361,358 A | 11/1994 | Cox et al. | |
| 5,361,359 A | 11/1994 | Tajalli et al. | |
| 5,367,667 A | 11/1994 | Wahlquist et al. | |
| 5,367,682 A | 11/1994 | Chang | |
| 5,371,883 A | 12/1994 | Gross et al. | |
| 5,379,407 A | 1/1995 | Todd | |
| 5,388,252 A | 2/1995 | Dreste et al. | |
| 5,390,324 A | 2/1995 | Burckhartt et al. | |
| 5,392,095 A | 2/1995 | Siegel | |
| 5,432,934 A | 7/1995 | Levin et al. | |
| 5,435,004 A | 7/1995 | Cox et al. | |
| 5,448,045 A | 9/1995 | Clark | |
| 5,455,933 A | 10/1995 | Schieve et al. | |
| 5,491,791 A | 2/1996 | Glowny et al. | |
| 5,535,381 A | 7/1996 | Kopper | |
| 5,537,653 A | 7/1996 | Bianchini, Jr. | |
| 5,594,663 A | 1/1997 | Messaros et al. | |
| 5,644,696 A | 7/1997 | Pearson et al. | |
| 5,657,473 A | 8/1997 | Killean et al. | |
| 5,678,002 A | 10/1997 | Fawcett et al. | |
| 5,732,212 A | 3/1998 | Perholtz et al. | |
| 5,732,268 A | 3/1998 | Bizzarri | |
| 5,732,275 A | 3/1998 | Kullick et al. | |
| 5,743,743 A | 4/1998 | Ho et al. | |
| 5,748,877 A | 5/1998 | Dollahite et al. | |
| 5,752,042 A * | 5/1998 | Cole et al. | 717/173 |
| 5,805,891 A | 9/1998 | Bizuneh et al. | |
| 5,826,012 A | 10/1998 | Lettvin | |
| 5,829,045 A | 10/1998 | Motoyama | |
| 5,845,077 A | 12/1998 | Fawcett | |
| 5,854,828 A | 12/1998 | Kocis et al. | |
| 5,884,073 A | 3/1999 | Dent | |
| 5,909,581 A | 6/1999 | Park | |
| 5,919,247 A | 7/1999 | Van Hoff et al. | |
| 5,933,646 A | 8/1999 | Hendrickson et al. | |
| 5,944,820 A | 8/1999 | Beelitz | |
| 5,974,454 A | 10/1999 | Apfel et al. | |
| 5,974,567 A | 10/1999 | Dickson, Jr. | |
| 5,982,891 A | 11/1999 | Ginter et al. | |
| 5,983,364 A | 11/1999 | Bortcosh et al. | |
| 5,983,369 A | 11/1999 | Bakoglu et al. | |
| 6,006,034 A | 12/1999 | Heath et al. | |
| 6,009,274 A * | 12/1999 | Fletcher et al. | 717/173 |
| 6,012,088 A * | 1/2000 | Li et al. | 709/219 |
| 6,016,536 A | 1/2000 | Wu et al. | |
| 6,026,500 A | 2/2000 | Topff et al. | |
| 6,074,434 A | 6/2000 | Cole et al. | |
| 6,078,322 A | 6/2000 | Simonoff et al. | |
| 6,091,412 A | 7/2000 | Simonoff et al. | |
| 6,094,654 A | 7/2000 | Van Huben et al. | |
| 6,105,063 A | 8/2000 | Hayes, Jr. | |
| 6,125,387 A | 9/2000 | Simonon et al. | |
| 6,151,708 A | 11/2000 | Pedrizetti et al. | |
| 6,167,567 A | 12/2000 | Chiles et al. | |
| 6,202,207 B1 * | 3/2001 | Donohue | 717/173 |
| 6,266,774 B1 | 7/2001 | Sampath et al. | |
| 6,301,710 B1 | 10/2001 | Fujiwara | |
| 6,330,715 B1 | 12/2001 | Razzaghe-Ashrafi | |
| 6,341,373 B1 | 1/2002 | Shaw | |
| 6,353,926 B1 | 3/2002 | Parthesarathy et al. | |
| 6,367,077 B1 | 4/2002 | Brodersen et al. | |
| 6,405,365 B1 * | 6/2002 | Lee | 717/106 |
| 6,425,125 B1 | 7/2002 | Fries et al. | |
| 6,434,744 B1 | 8/2002 | Chamberlain et al. | |
| 6,493,871 B1 * | 12/2002 | Welch et al. | 717/173 |
| 6,535,911 B1 | 3/2003 | Miller et al. | |
| 6,567,860 B1 | 5/2003 | Maxwell et al. | |
| 6,574,729 B1 * | 6/2003 | Fink et al. | 713/1 |
| 6,832,373 B2 | 12/2004 | O'Neill | |
| 6,836,657 B2 | 12/2004 | Ji et al. | |
| 7,171,660 B2 * | 1/2007 | McCaleb et al. | 717/171 |
| 7,478,381 B2 * | 1/2009 | Roberts et al. | 717/168 |
| 2002/0016956 A1 | 2/2002 | Fawcett | 717/11 |
| 2002/0147974 A1 * | 10/2002 | Wookey | 717/176 |
| 2004/0044999 A1 * | 3/2004 | Gibson | 717/178 |
| 2004/0148585 A1 * | 7/2004 | Sengodan | 717/101 |
| 2004/0215755 A1 * | 10/2004 | O'Neill | 709/223 |
| 2005/0022177 A1 | 1/2005 | McCaleb et al. | |
| 2005/0149925 A1 * | 7/2005 | Pichetti et al. | 717/177 |
| 2007/0214215 A1 | 9/2007 | McCaleb et al. | |

* cited by examiner

INTELLIGENT PATCH CHECKER

RELATED APPLICATIONS

The present application is a continuation of U.S. patent application Ser. No. 10/869,591, filed on Jun. 15, 2004 now U.S. Pat. No. 7,171,660, which is a continuation of U.S. patent application Ser. No. 09/580,931, filed on May 25, 2000, now issued as U.S. Pat. No. 6,751,794. These patent applications are hereby incorporated by reference.

FIELD OF THE INVENTION

The present invention relates generally to field of remote support for computer systems. More specifically, the present invention is directed to a method and an apparatus for updating software in a plurality of computer systems.

BACKGROUND

Personal computers have become an important part of the information age. The use of the personal computers has expanded beyond the traditional university campus and large office environments. Today, many small businesses and residences have at least one personal computer running a wide range of applications sold by many different software vendors.

As the applications become easier to use, the personal computers are no longer considered the tool for only the technical users. The user community has expanded and the personal computers are being viewed more as the tools to run the applications. Most users are interested in dealing with the applications and usually have no clue when something goes wrong with their personal computers. When the user is unable to use the application on the user's personal computer, the usual action is to take the personal computer to a local personal computer repair shop.

Since there are many different brands of personal computers such as, for example, IBM, Compaq, Gateway, Dell, etc., it is usually the case that each personal computer from a different brand may have a different set up. For example, the IBM personal computer may use a different video adapter from the Dell personal computer, among others. As such, to have a problem corrected, the user usually has to bring the personal computer into the repair shop so that the technician can isolate the problem.

One of the most common problems of application failure is incompatibility. The incompatibility may be related to the hardware or to the other applications in the same personal computer system. For example, the user may have installed a new application that is incompatible with the existing application when running together. The user may have installed a new hardware adapter that is incompatible with the existing application without installing a necessary update. Often the identification of the incompatibility occurs at a most unfortunate time such as, for example, prior to the user having an opportunity to save the work in progress. This experience is frustrating, time consuming and can be costly for the user.

SUMMARY OF THE INVENTION

A client computer sends application information about software applications on the client computer to a server system. The server system performs a comparison between the application information about the software application and the most-updated upgrade package for the software application. The most-updated upgrade package for the software application is stored in a part database. The most-updated upgrade package for the software application is received by the client system automatically when the comparison indicates that the most-updated upgrade package has not been installed on the client system. A client database stores a plurality of configuration files for a plurality of client systems. A first configuration file provides the sever system with the knowledge of the software applications installed on the client system. The application information about the software application comprises version information of the software applications and is stored in a database in the client system.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Figure 1:
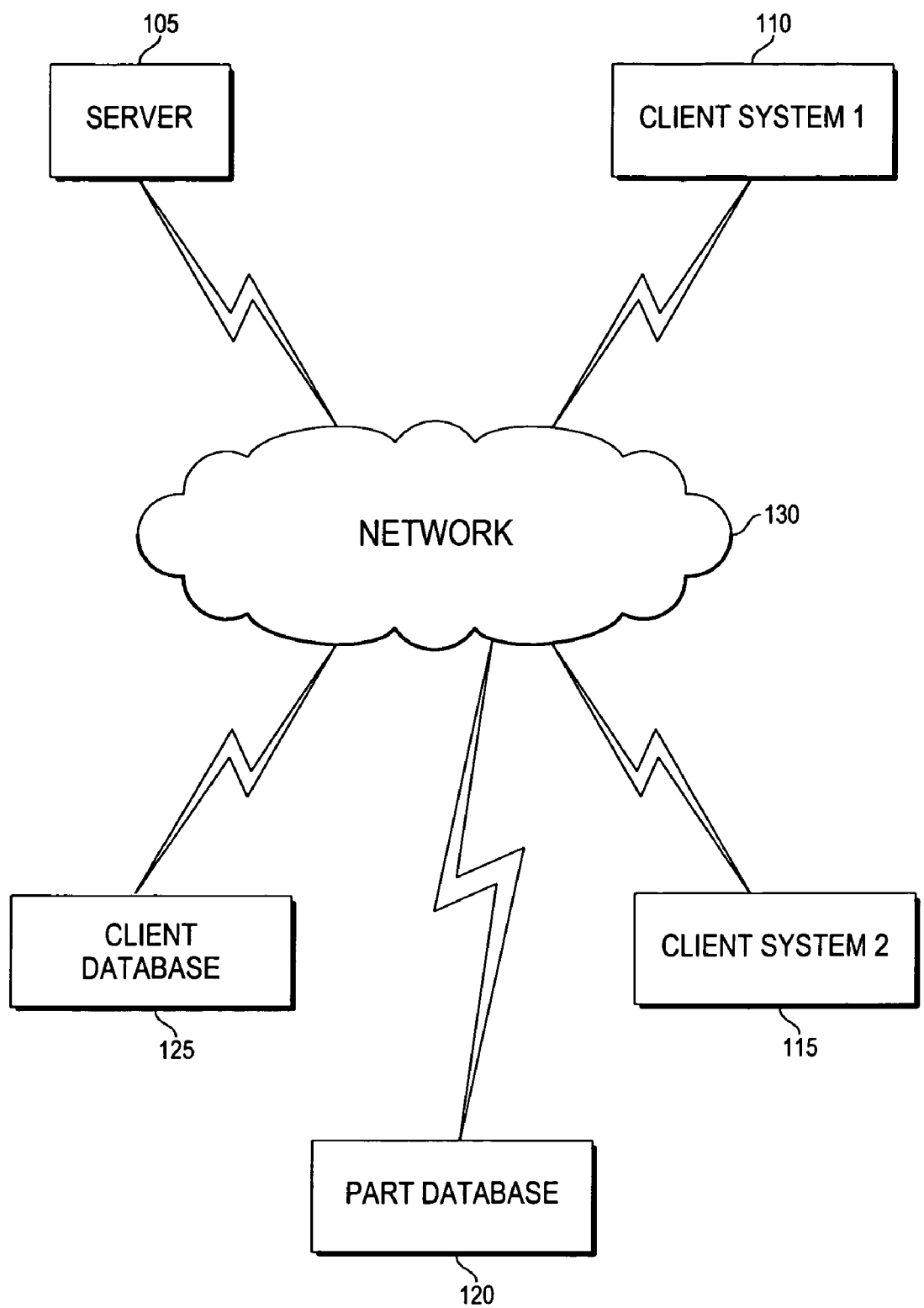
FIG. 1 is a network diagram illustrating one embodiment of components connected in a network that can be used with the method of the present invention.

A method and apparatus for remotely updating software in a plurality of computer systems is disclosed. In the following description, for purposes of explanation, specific nomenclature is set forth to provide a thorough understanding of the present invention. However, it will be apparent to one skilled in the art that these specific details are not required in order to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, the present invention is not described with reference to any particular programming language. It will be appreciated that a variety of programming languages may be used to implement the teachings of the invention as described herein.

In one embodiment, the method disclosed in the present invention allows for better remote support of users of client systems in the network. A server provides update information to multiple client systems connected in a network. When necessary, the updates are retrieved from a central depository, sent to the appropriate client systems and automatically update the applications. In one embodiment, the client systems are IBM-compatible personal computers running in the Window environment such as, for example, Windows 98, Windows 2000, etc. The server and the client systems are connected in a network such as, for example, the Internet. By keeping the client systems updated, remote support can be efficiently performed to minimize the down time of the client systems. Each client system comprises of multiple installed software packages. The software packages may have been previously installed on the client system prior to delivery to a user. The software may include, for example, application software, device drivers, etc.

FIG. 1 illustrates an exemplary embodiment of the update network. A server 105 maintains a client database 125 to keep track of the client systems 110, 115. For example, whenever a client system 110 or 115 communicates with the server 105, the server 105 already knows about the installed software on that client system 110, 115. The server 105 also maintains a part database 120 containing software patches and software updates to help keeping the client systems 110 and 115 up to date. The client database 125 allows the server 105 to know about the configuration of the client systems 110 and 115. The client database 125 and the part database 120 may be in the same database server or in separate database servers connected in the network 130. Alternatively, the client database 125 and the part database 120 may be in the same system as the server 105. In one embodiment, the server 105 serves as a central point for receiving update requests from the client systems 110 and 115 and for retrieving information from the databases 125 and 120 to satisfy the update requests.

Figure 2:
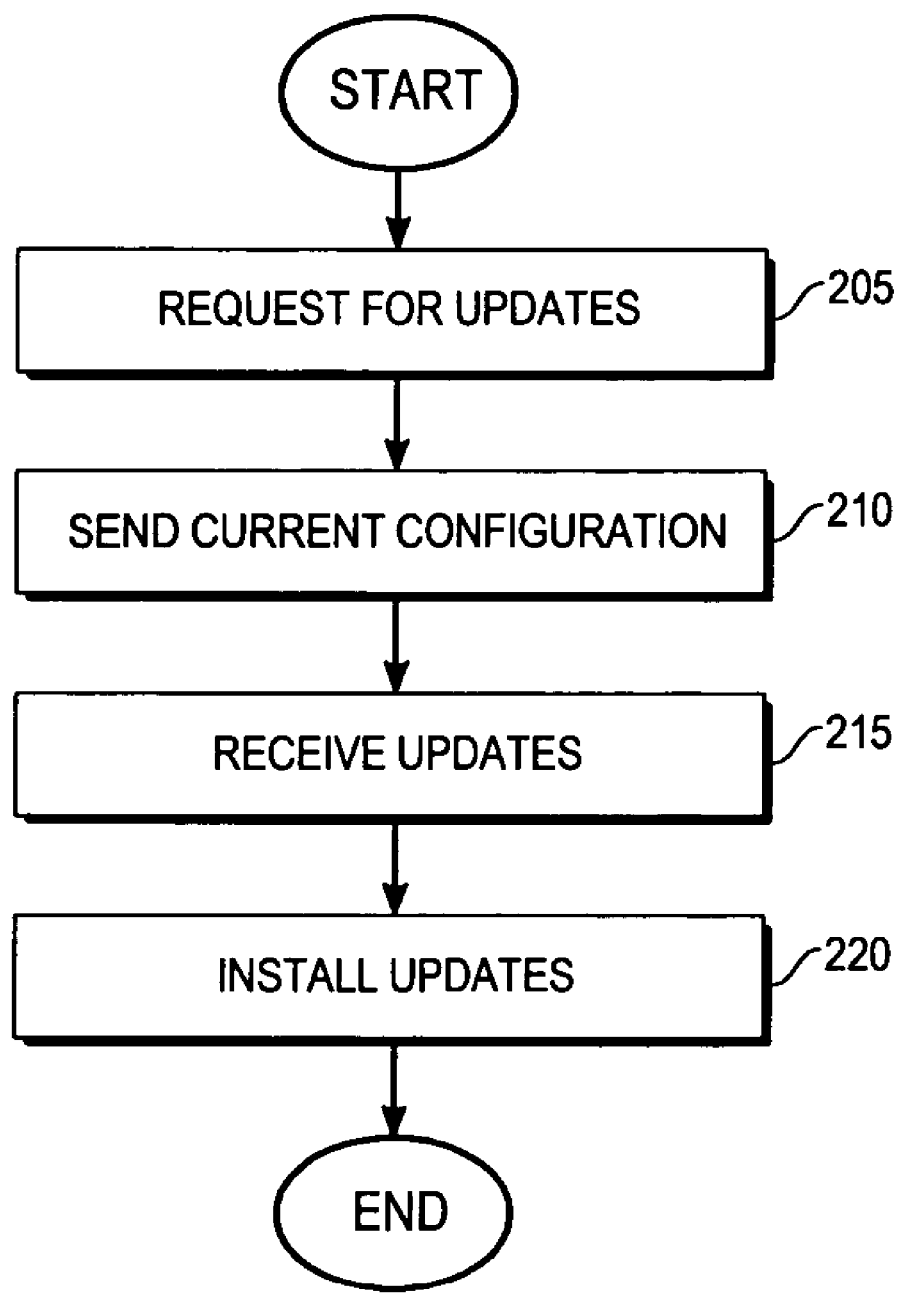
FIG. 2 is a flow diagram illustrating one embodiment of an update process.

FIG. 2 is a flow diagram 200 illustrating one embodiment of an update method. At block 205, an update request is generated by the client system 110, 115 and sent to the server 105. The update is performed on a periodic basis, such as, for example, every 24 hours. Alternatively, the update may be performed at any time by the user sending an update request to the server 105 on the network. The server 105 knows each client system 110, 115 by a unique identification associated with the client system 110, 115.

In one embodiment, the server 105 accesses a client database 125 containing information about the client system 110, 115. The client database 125 may include information, such as, for example, installed software packages on the client system 110, 115, the operating system installed on the client system 110, 115, etc. However, what the server 105 may not know is whether these installed software packages are up to date. For example, the user of the client system 110, 115 may have changed the configuration parameters of the software packages, or the user may not have requested for an update for an extended length of time due to the client system 110, 115 not being connected to the network 130.

In one embodiment, the client system 110, 115 may need to do a self-check and send its current software configuration to the server 105. A self-check may be done by the server 105 directing the client system 110, 115 specifically what to check for and the information to be collected from the client system 110, 115. This information is the sent to the server 105, as shown in block 210. Based on this information, the server 105 checks its part database 120 and determines the updates that the client system 110, 115 needs. The updates are sent from the server 105 to the client system 110, 115, as shown in block 215. The updates may be sent with instructions from the server 105 that tells the client system 110, 115 what to do to have the updates installed, as shown in block 220.

Figure 3:
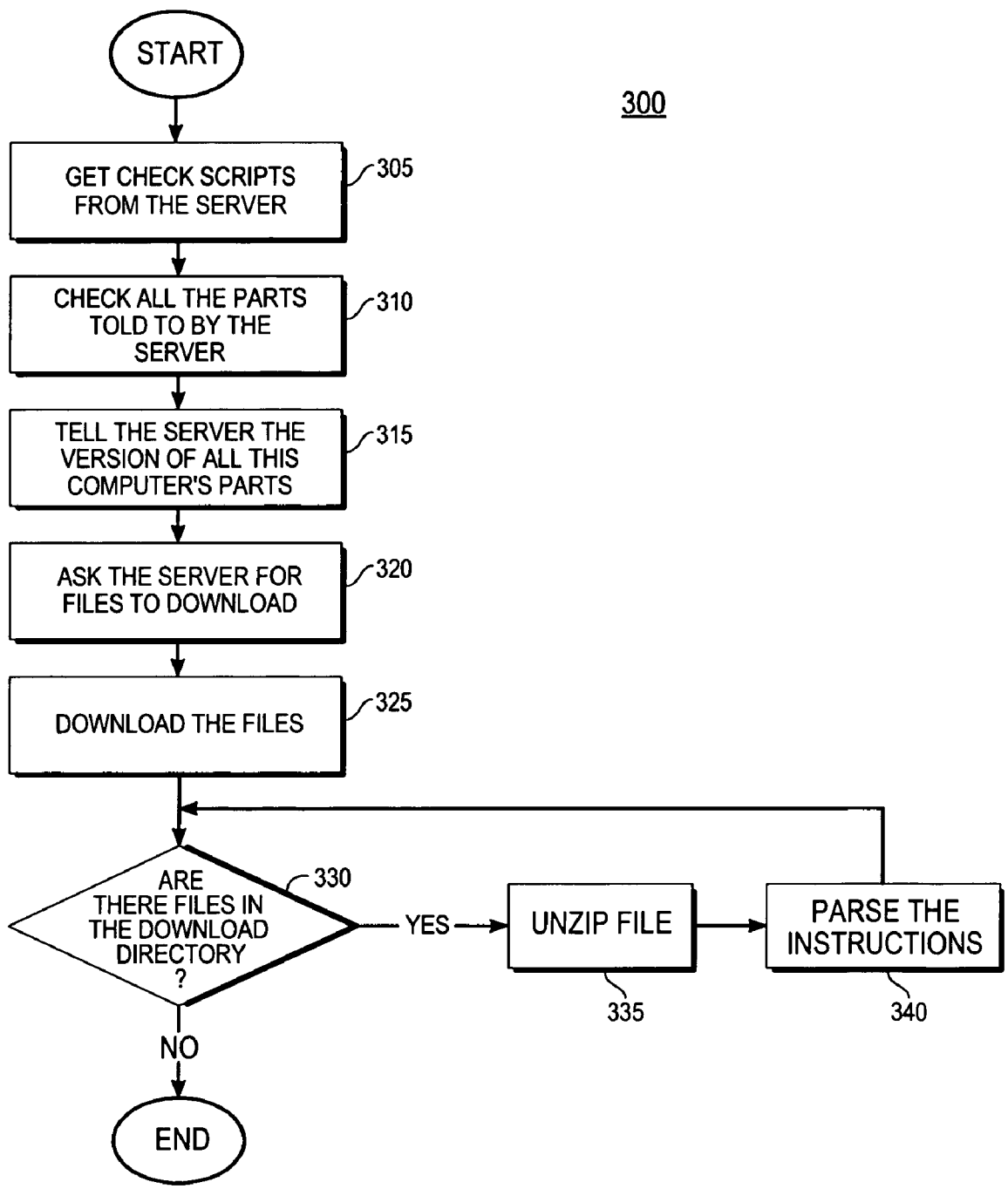
FIG. 3 is another flow diagram illustrating one embodiment of the update process.

FIG. 3 is another flow diagram illustrating one embodiment of an update method 300. In one embodiment, a utility program executed by the client system 110, 115 communicates with the server 105 for information to check on the client system 110, 115. The execution of this utility program may be initiated by the user or it may be automatic. The utility program is herein referred to as a patch checker. The patch checker initiates the request to have the applications verified for any necessary updates. The request is sent to the server 105 along with the unique identification number of the client system 110, 115. The server 105 uses the client identification number to check against the client database 125 for authentication. In one embodiment, the database contains configuration information about the client system 110, 115. The server 105 retrieves the configuration information for the client system 110, 115, generates a script file and sends the script file to the client system 110, 115, as shown in block 305. In one embodiment, the script file contains commands that tell the client system 110, 115 the functions to perform. For example, the commands may direct the client system 110, 115 to perform self-check functions. The self-check functions may have the following parameters:

'v: filename' get the file's version
'm: filename' get the file's modified date

'd: driveletter' get amount of free disk space
'r: keyname' get the value of the specified registry key
's: filename' get the size of the file.

In one embodiment, the commands are executed by the client system 110, 115 to collect information pertinent to the applications currently installed on the client system 110, 115.

The script file may contain a list of parts that the server 105 thinks the client system 110, 115 has and that the server 105 wants the client system 110, 115 to check. The parts may be the names of the applications and the server 105 may want the client system 110, 115 to collect the current version information about the applications. In one embodiment, in order to keep the information in the client database 125 accurate, the user may not want to alter the configuration of the applications that are to be supported remotely by the server 105. Keeping the client system 110, 115 and the information in the client database 125 synchronized may help making the update process by the server 105 more efficient.

In block 310, using the script information sent by the server 105, the patch checker parses the server's commands to check the software parts on the client system 110, 115. The appropriate information about these software parts is collected. In one embodiment, the version of each software part is collected and sent to the server 105, as shown in block 315. The server 105 uses the information collected from the client system 110, 115 and compares it with a part database 120. For example, the server 105 may check the version number collected from the client system 110, 115 with the version of the same software part in the part database 120. In one embodiment, the server 105 may want to get the most updated version distributed to the client system 110, 115.

When the version information collected from the client system 110, 115 is not at the same level with the version of the same software part in the part database 120, the most updated version is retrieved from the part database 120. When the version information from the client system 110, 115 is already up to date, there is nothing to download. In block 320, the patch checker asks the server 105 for the files associated with the updated versions of the software to download. The files are downloaded from the server 105 to the client system 110, 115 in block 325. In one embodiment, each download file is associated with an uniform resource locator (URL). The server 105 replies to the update request by sending the patch URL.

There may be one or more download files for each software to be updated, and there may be more than one software that needs to be updated, the server 105 may send several download files to the client system 110, 115. The download files may be stored in a predefined directory such as, for example, the download directory. Each download file is processed individually, as shown in block 330. In one embodiment, the download files are received from the server 105 in a compressed format, such as, the zip format, and need to be uncompressed or expanded, as shown in block 335. Each download file is expanded into an executable program and multiple related data files. One of the data files is a text file or an instruction file containing a set of instructions or commands that can be parsed by the executable program to perform the update process, as shown in block 340. For example, the instruction may be one of the following commands:

Delete a file
ShellExecute
ShellExecute with wait
Registry Change
Add message to a tool bar
Kill a particular process
Ask for reboot
Force reboot
Ask user to install now or later
Ask user to close all programs When all of the download files have been expanded and copied into the appropriate directories, the update process is completed. At that time, the user may be given an option of rebooting the client system 110, 115 to activate the updated version. Alternatively, the user may continue working with the currently installed version and reboot the client system 110, 115 at a later time.

Figure 4:
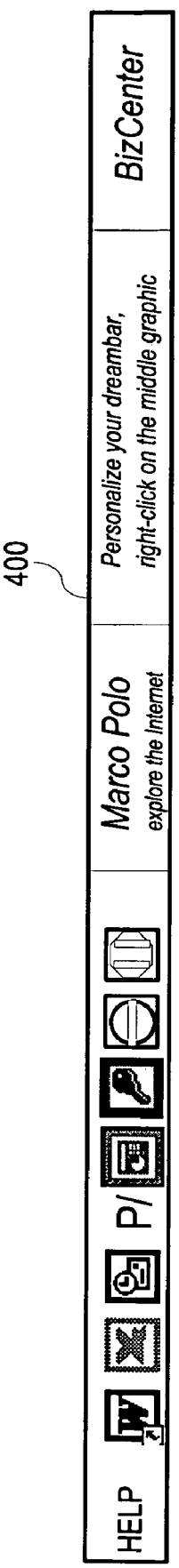
FIG. 4 is an exemplary tool bar that can be used with one method of the present invention.

FIG. 4 illustrates an exemplary tool bar that can be used with the present invention. In one embodiment, the tool bar is a list of dynamic link libraries (DLL) and is always running. Additional functions can be added to the tool bar by adding DLL files. For example, the patch checker can be added to the tool bar 400 by adding a patcher.dll to the tool bar 400, and a patch checker icon can be displayed. By selecting the patch checker icon, the user can initiate the update process at any time. In one embodiment, the tool bar 400 is also used to display update related messages to the user.

Figure 5:
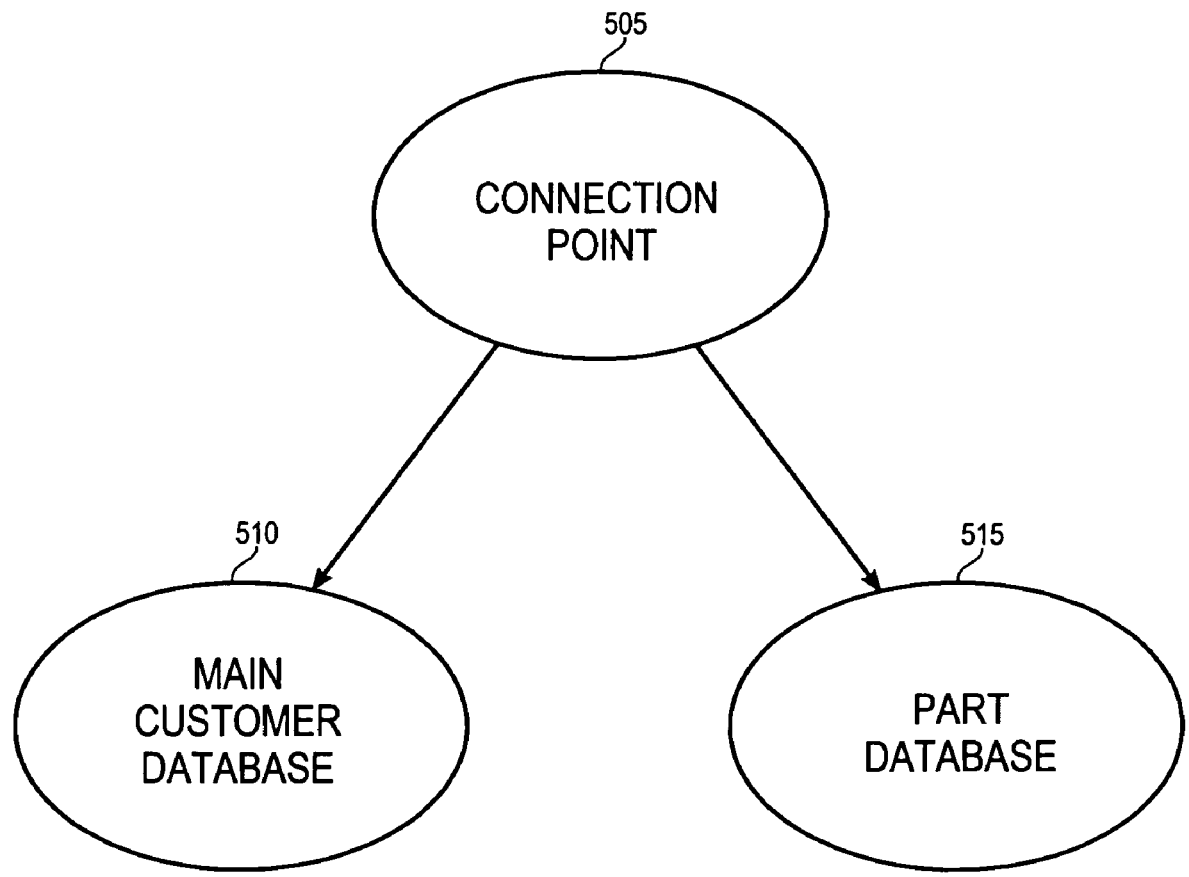
FIG. 5 is an exemplary diagram illustrating a relationship between a server connection point, a customer data base and a part data base.

FIG. 5 is an exemplary diagram illustrating a relationship between a connection point, a customer data base and a part data base. In one embodiment, the server provides a connection point 505 that connects to a customer database 510. The customer database 510 maintains the state of every client system in the network. The state includes information concerning relevant hardware and software as currently installed on the client system. This information includes, for example, the versions of the installed software applications, the versions of the installed hardware drivers, etc. Additionally, the connection point 505 is also connected to a part database 515. The part database 515 may contain the different versions of the application software, the DLLs, the hardware drivers, and any other software modules that may be installed on the client system. The server uses the part database 515 to keep the client system up to date. For example, when the client system is identified to have a hardware driver that is not current, the most up-to-date hardware driver is retrieved from the part database 515.

In one embodiment, a client part database is maintained in the client system. The client part database contains the versions of the software that are installed on the client system. As additional software is installed on the client system, the client part database is updated accordingly. In one embodiment, when the server wants to know the versions of the software installed on the client system, the patch checker retrieves the version information from the client part database.

Figure 6:
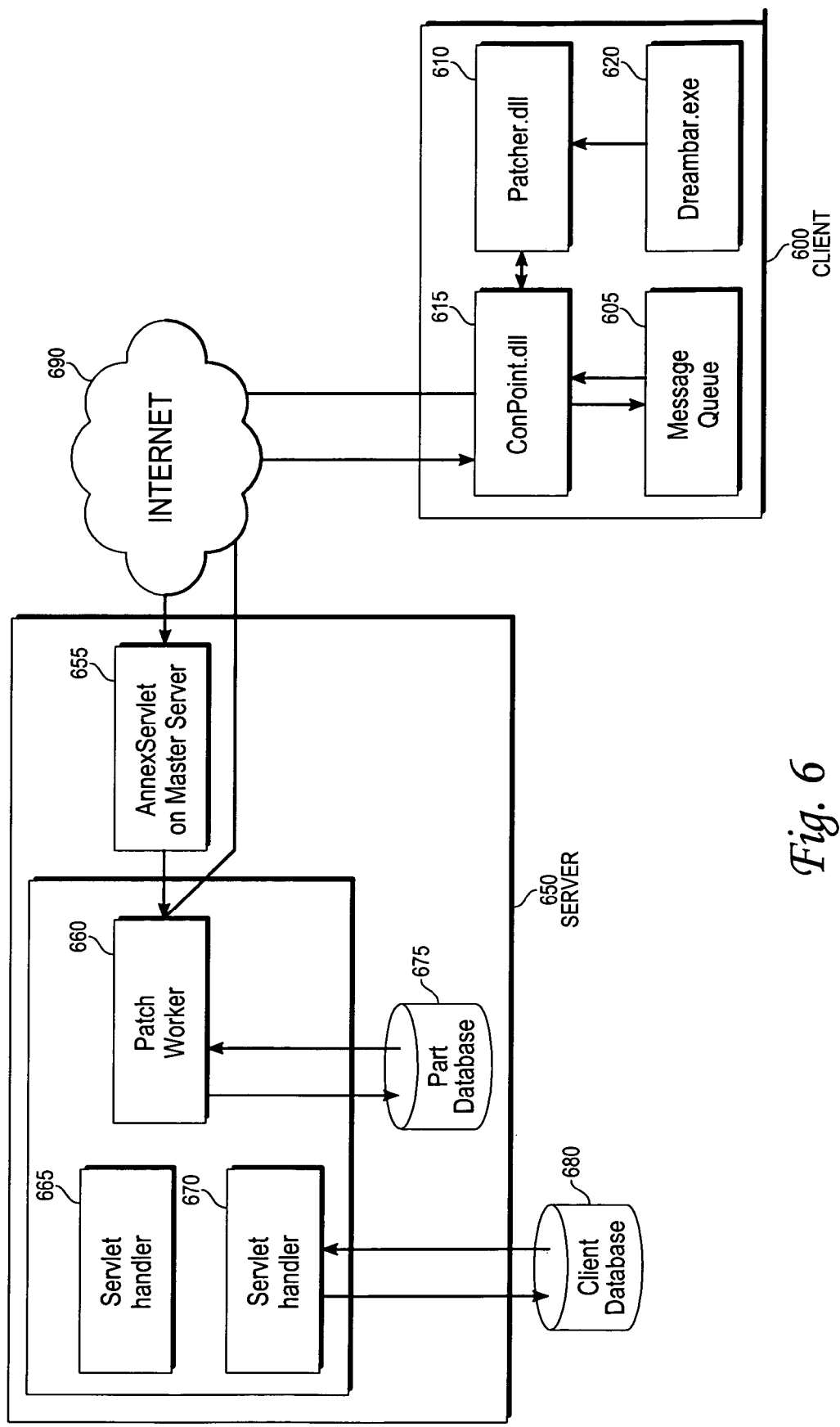
FIG. 6 is an exemplary diagram illustrating a communication protocol between a client system and the server through the Internet network

FIG. 6 is an exemplary diagram illustrating a communication protocol between a client system 600 and a server 650 through the Internet network. In one embodiment, the client system 600 has a message queue 605 to store messages that certain application 610, such as, for example, the patch checker (patcher.dll), wants to send to the server 650. The user selects the patch checker icon on the tool bar 400 displayed by the tool bar program 620 (dreambar.exe) to execute the patch checker 610. The message queue 605 is processed periodically, such as, for example, every thirty minutes, while the user is connected to the Internet 690. When the user is not connected to the Internet 690, the messages from the patch checker (applications) 610 are stored in the message queue 605. In one embodiment, the patch checker 610 connects to the server 650 through a message handler 615 (ConPoint.dll). The message handler 615 handles the messages generated by the patch checker 610 including, for example, the request for an update. The message handler 615 sends the message to the server 650. In another embodiment, the message queue 605 is implemented as a text file located in a message queue directory.

In one embodiment, the server 650 is implemented with multiple java servlets. A master servlet 655 (AnnexServlet) is used to route all the messages received from the client systems 600 to the other servlets 665, 670 on the server 650. Each of the servlets 660, 665, 670 handles different type of messages. In one embodiment, as each servlet starts up, the servlet tells the master servlet which type of messages the servlet 660, 665, 670 handles. The master servlet 655 may be used as the connection point on the server 650. Each of the servlets 660, 665, 670 may be used as a worker. For example, the serverlet 660 is the patch worker handling the update messages from the patch checker 610. The patch worker 660 sends the script file to the patch checker 610. The script file is used by the patch checker 610 to check the client system 600. When the patch checker 610 requests for the download, the patch worker 660 accesses the part database 665 to retrieve the necessary software versions for the client system 600. It will be apparent to one skilled in the art that there may be other workers (servlets) on the server 650, such as, for example, a buildworker to add a new client system to the client database, a viewworker to view contents of the client database 680 and the part database 675, a dataworker to store data, and a messageworker to get the messages to be displayed on the tool bar 400.

In one embodiment, each client system 600 is associated with a unique identification number known to the server 650. As a new client system 600 is inserted into the network, the client database 680 is updated with the identification number of that new client system 600. Similarly, when the client system 600 is removed from the network, the client database 680 is updated accordingly. In one embodiment, the server 650 generates a report listing all the identification number of those client systems 600 that have not communicated with the server 650 for over a predetermined length of time. The report can then be used to investigate status of these client systems.

Figure 7:
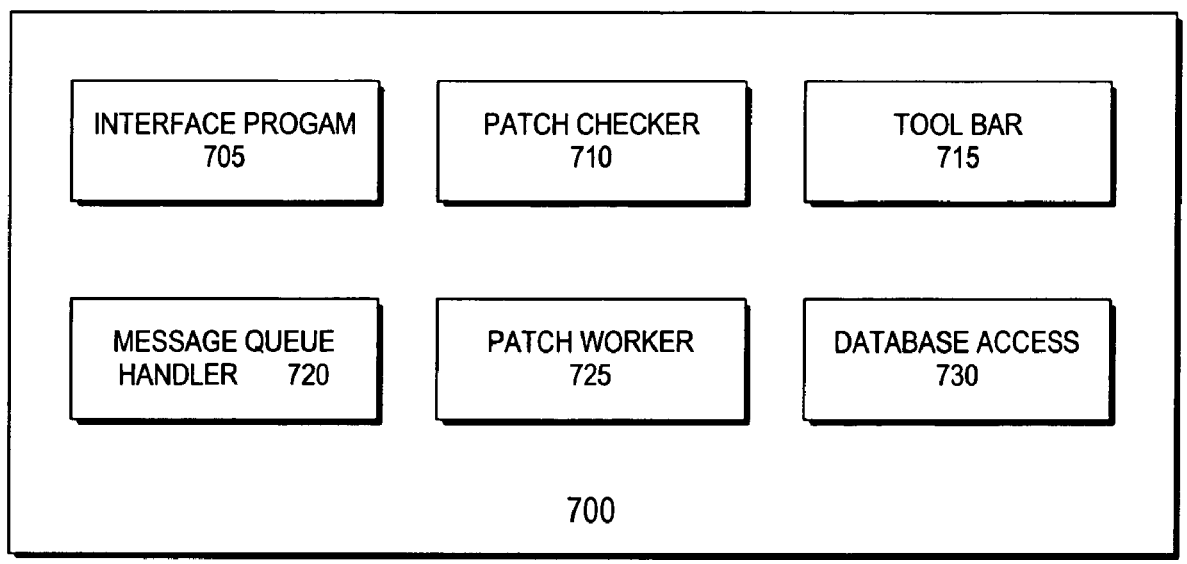
FIG. 7 illustrates one embodiment of a computer-readable medium containing various sets of instructions, code sequences, configuration information, and other data used by a computer or other processing device.

FIG. 7 illustrates an embodiment of a computer-readable medium 700 containing various sets of instructions, code sequences, configuration information, and other data used by a computer or other processing device. The embodiment illustrated in FIG. 7 is suitable for use with the software update method described above. The various information stored on medium 700 is used to perform various data processing operations. Computer-readable medium 700 is also referred to as a processor-readable medium. Computer-readable medium 700 can be any type of magnetic, optical, or electrical storage medium including a diskette, magnetic tape, CD-ROM, memory device, or other storage medium.

Computer-readable medium 700 includes interface code 705 that controls the flow of information between various devices or components in the computer system. Interface code 705 may control the transfer of information within a device (e.g., between the processor and a memory device), or between an input/output port and a storage device. Additionally, interface code 705 may control the transfer of information from one device to another or from one network component to another.

Computer-readable medium 700 also includes the patch checker program 710 that is used to request and receive software patches or updates from the server. Other codes stored on the computer-readable medium 700 may include the tool bar program 715 to display the patch checker icon, the message queue handler program 720 to receive the messages generated by the patch checker and send the messages to the server. The computer-readable medium 700 may also contain programs run on the server. These programs may include the patch worker 725 that communicates with the patch checker 710 from the server side, and the database access program 730 that allows the server to view the client database and the part database.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of monitoring for updates relating to software applications on a client system, the method including:
receiving a unique identification communicated from the client system to a server system, the unique identification identifying the client system and used by the server system to access a database maintained by the server system to identify a plurality of software applications on the client system;
transmitting a file from the server system, the file including commands for execution on the client system and pertaining to the plurality of software applications on the client system; and,
in response to the client system's
  (1) parsing the file in a parser on the client system to identify the commands,
  (2) executing the commands on the plurality of software applications, the commands executed to collect information pertaining to the plurality of software applications on the client system, and
  (3) transmitting the collected information to the server system;
receiving the collected information from the client system;
performing a comparison at the server system between the collected information and a most updated update package for the software applications to determine which files are needed to update the software application on the client system, wherein the most-updated update package for the software application is stored in a database, and
transmitting at least one download file in response to the collected information, the at least one download file including a command to ask a user to install an application now or later.

2. The method of claim 1, which includes:
in response to receiving the collected information communicated to the server system,
transmitting at least one update file for at least one software application of the plurality of software applications.

3. The method of claim 2, which includes updating the at least one software application using the at least one update file.

4. The method of claim 2, which includes:
transmitting an update file for each software application requiring updating, each update file capable of being processed individually.

5. The method of claim 2, in which the at least one update file is compressed for expansion at the client system.

6. The method of claim 2, wherein the at least one update file is identified from a comparison between the collected information received from the client system and one of a plurality of configuration files for a plurality of client systems, the plurality of configuration files each having knowledge of the plurality of software applications stored on an associated client system.

7. The method of claim 2, in which the at least one update file is an upgrade package, the method including providing for the upgrade package to be transmitted automatically when the upgrade package has not been installed on the client system.

8. The method of claim 1, which includes receiving, by the server system, the unique identification for the client system and the collected information, the unique identification recognizable by the server system to identify the client system.

9. The method of claim 1, which includes:
in response to the server system receiving the collected information, transmitting at least one Uniform Resource Locator (URL) link that provides the at least one download for a software application of the plurality of software applications requiring updating.

10. The method of claim 1, which includes:
transmitting at least one download file in response to the collected information received by the server system, the at least one download file including at least one command selected from a group including:
Delete a file;
ShellExecute:
ShellExecute with wait:
Registry Change;
Add message to a tool bar;
Kill a particular process;
Ask for reboot;
Force reboot; and
Ask user to close all programs.

11. The method of claim 1, in which the at least one command includes at least one self-check functions including at least one parameter selected from a group including:
get a file's version;
get a file's modified date;
get an amount of free disk space;
get a value of a specified registry key; and
get a size of a file.

12. The method of claim 1, wherein the file is a script file and the commands included in the script file are capable of being executed by a utility application included in the client system.

13. The method of claim 1, which includes the server system receiving a request for the file from the client system.

14. The method of claim 1, in which the file transmitted by the server system identifies the software applications on the client system that are known to the server system.

15. The method of claim 1, wherein the server system manages a plurality of client systems via the Internet, the plurality including the client system.

16. A non-transitory- machine-readable medium embodying instructions which, when executed by a machine, cause the machine to perform the method of claim 1.

17. The method of claim 8 wherein the unique identification for the client system is stored in a registry in the client system.

18. A system to monitor updates relating to software applications on a client system, the system including:
means for receiving a unique identification communicated from the client system to a server system, the unique identification identifying the client system and used by the server system to access a database maintained by the server system to identify a plurality of software applications on the client system;
means for transmitting a file from the server system to the client system, the file including commands for execution on the client system and pertaining to the plurality of software applications on the client system:
means responsive to the client system's
(1) parsing the file in a parser on the client system to identify the commands,
(2) executing the commands on the plurality of software applications, the commands executed to collect information pertaining to the plurality of software applications on the client system, and
(3) transmitting the collected information to the server system;
for receiving the collected information from the client system;
for performing a comparison at the server system between the collected information and a most updated update for the software applications to determine which files are needed to update the software application on the client system, wherein the most-updated update package for the software application is stored in a database, and
for transmitting at least one download file in response to the collected information, the at least one download file including a command to ask a user to install an application now or later.

* * * * *